United States Patent [19]
Jacobs

[11] Patent Number: 5,909,563
[45] Date of Patent: Jun. 1, 1999

[54] COMPUTER SYSTEM INCLUDING AN INTERFACE FOR TRANSFERRING DATA BETWEEN TWO CLOCK DOMAINS

[75] Inventor: Eino Jacobs, Palo Alto, Calif.

[73] Assignee: Philips Electronics North America Corporation, New York, N.Y.

[21] Appl. No.: 08/914,473

[22] Filed: Aug. 19, 1997

Related U.S. Application Data

[60] Provisional application No. 60/027,097, Sep. 25, 1996.

[51] Int. Cl.$^6$ ..................................................... G06F 13/38
[52] U.S. Cl. ........................ 395/309; 395/311; 395/287; 395/284; 395/533; 395/556; 375/106
[58] Field of Search ........................... 395/309–311, 287, 395/284, 556, 553; 375/106, 107, 111, 119

[56] References Cited

U.S. PATENT DOCUMENTS

| | | | |
|---|---|---|---|
| 4,811,364 | 3/1989 | Sager et al. | 375/106 |
| 5,115,455 | 5/1992 | Samaras et al. | 375/106 |
| 5,274,678 | 12/1993 | Ferolito et al. | 375/108 |
| 5,359,630 | 10/1994 | Wade et al. | 375/106 |
| 5,487,092 | 1/1996 | Finney et al. | 375/354 |
| 5,765,009 | 6/1998 | Ishizaka | 395/800.01 |
| 5,768,546 | 6/1998 | Kwon | 395/307 |
| 5,787,301 | 7/1998 | Arakawa et al. | 395/800.2 |
| 5,802,355 | 9/1998 | Arroyo et al. | 395/553 |

FOREIGN PATENT DOCUMENTS

0666541A1  8/1995  European Pat. Off. .

*Primary Examiner*—Ayaz R. Sheikh
*Assistant Examiner*—Raymond N. Phan
*Attorney, Agent, or Firm*—Steven S. Rubin

[57] ABSTRACT

An interface between two clock domains transfers data between the two clock domains without corruption or loss of data being transferred. Each clock domain has a respective clock. The two clocks have a fixed relationship. A data signal is registered in a plurality of registers in the first clock domain, the number of which is related to the fixed relationship of the clocks. Each register outputs a specific output signal, one of which is selected by a multiplexer in the second clock domain, to be output to an output register. The output register then outputs the data in synchronism with the second clock.

11 Claims, 5 Drawing Sheets

COMPUTER SYSTEM INCLUDING AN INTERFACE FOR TRANSFERRING DATA BETWEEN TWO CLOCK DOMAINS

CROSS-REFERENCE TO RELATED APPLICATIONS

This application claims the benefit of U.S. Provisional Application No. 60/027,097 filed Sep. 25, 1996.

BACKGROUND OF THE INVENTION

The present invention relates to the field of data transfer between systems having different clocks. In computer systems, one subsystem may utilize a first clock while other subsystems may utilize different clocks.

A solution was needed to synchronize systems when phase-locked clocks were being used.

SUMMARY OF THE INVENTION

The present invention transfers data from a first subsystem having a first clock to a second subsystem having a second clock. The clocks may differ in their respective frequencies; however, certain clock edges have a fixed timing relationship. An interface is coupled between the first subsystem and the second subsystem for transferring data between the two subsystems without corruption or loss of the data being transferred.

An object of the present invention is to transfer data from the first subsystem having a first clock to the second subsystem having a second clock, although the clocks may differ in their respective frequencies using a property that phases of the two clock domains are locked. Transfer of data is done with minimum latency and a minimum number of pipeline registers between the subsystems.

Another object of the invention is to prevent meta stability problems from occurring. A synchronizer between two clock domains which does not utilize phase locking suffers from meta stability problems.

Still other objects and advantages of the invention will, in part be obvious and will in part be apparent from the disclosure.

BRIEF DESCRIPTION OF THE DRAWINGS

For a fuller understanding of the invention, reference is made to the following description taken in connection with the accompanying drawings, in which.

DESCRIPTION OF PREFERRED EMBODTMENTS

Figure 1:
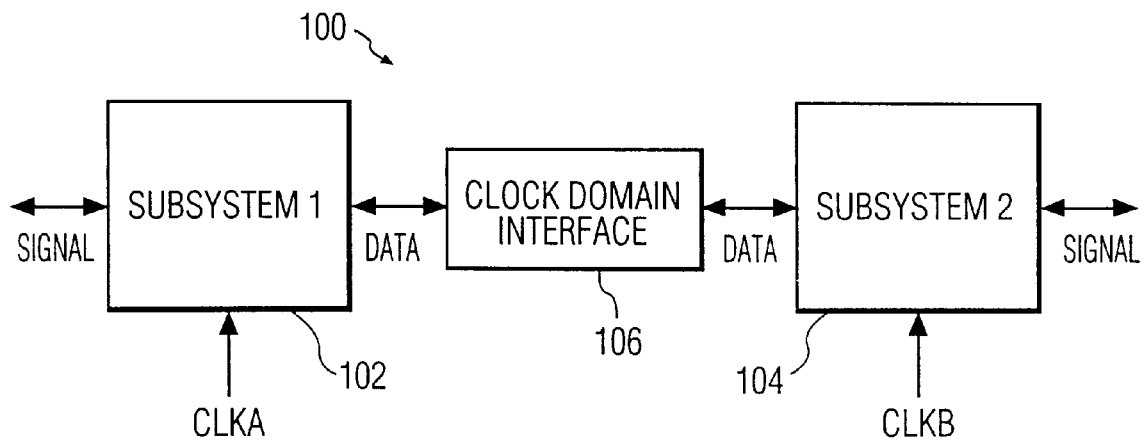
FIG. 1 is a block diagram of a system having two subsystems, each with a respective clock.

In the system of FIG. 1, a first and a second subsystem 102 and 104 exist within a system 100. The first subsystem 102 is clocked by a first clock CLKA and the second subsystem 104 is clocked by a second clock CLKB. The first and second clocks may have different frequencies; however certain clock edges of the first and second clocks have a fixed relationship, i.e., the clocks are synchronized but with a skew which may have a maximum.

Due to the differing clock frequencies and to prevent subsystem 1 from switching data when subsystem 2 tries to sample the data, an interface 106 is provided between subsystems 1 and 2 for transferring data between the two subsystems 102 and 104 without problems such as data loss or corruption.

Figure 2:
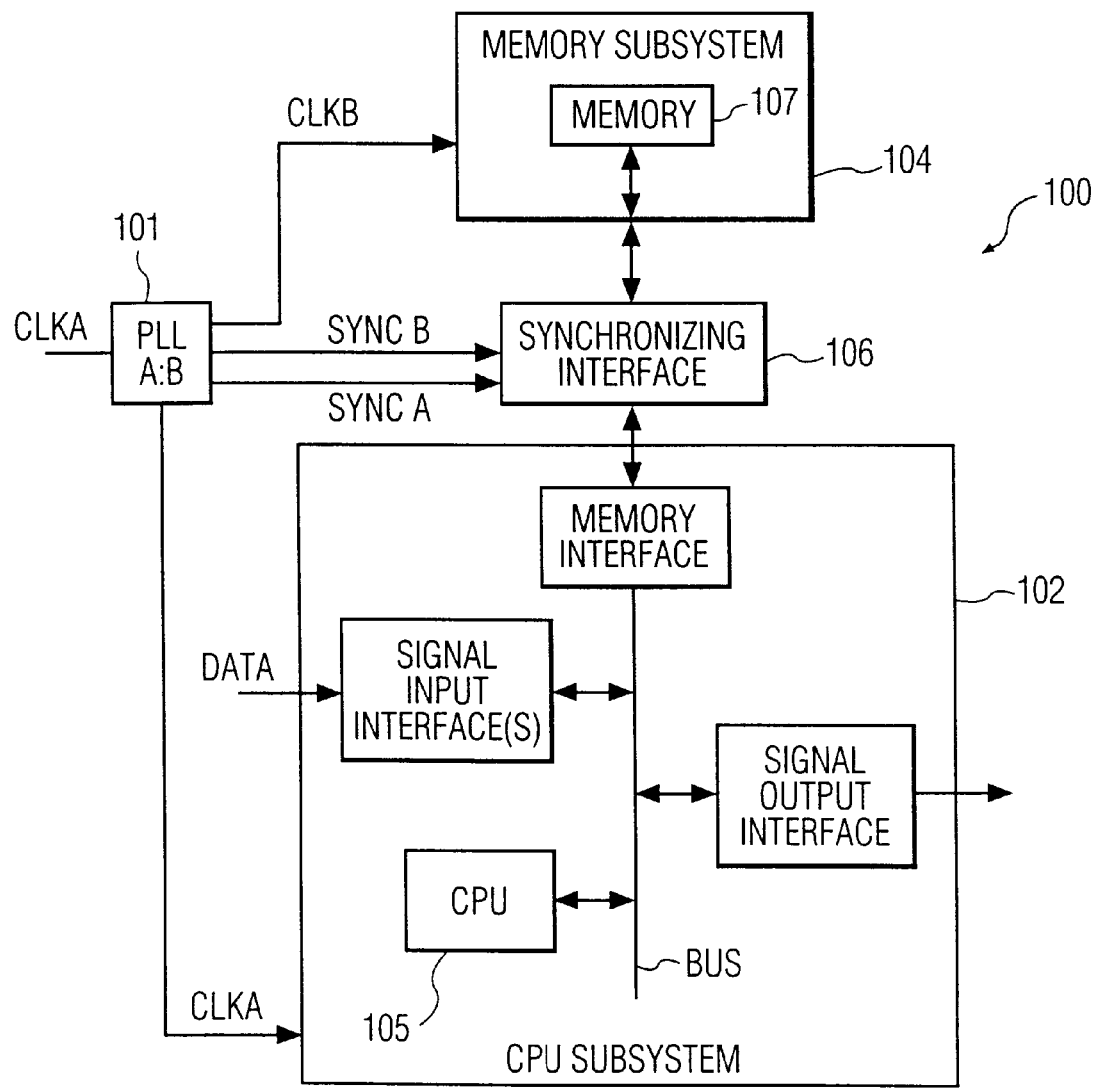
FIG. 2 is a more detailed block diagram of a system having two subsystems, each with a respective clock, and an interface.

FIG. 2 illustrates a detailed example of an embodiment of the system 100. The first subsystem 102, including a central processing unit (CPU) 105, and the second subsystem 104, including memory 107, exist within the system 100. The synchronizing interface 106 is provided between the CPU subsystem 102 and the memory subsystem 104 to permit transfer of data between these two subsystems. The CPU subsystem 102 is clocked by the first clock CLKA and the memory subsystem 104 is clocked by the second clock CLKB. The fixed relationship between CLKA and CLKB may be achieved, for example, through a PLL (phase locked loop) 101. CLKA is supplied to, in this example, the phase locked loop 101 which supplies CLKB to the memory subsystem 104. Additionally, the PLL 101 supplies two synchronizing signals SYNCA and SYNCB to the synchronizing interface 106. The synchronizing signals indicate when the clock signals CLKA and CLKB are synchronized, i.e., their respective pulses have respective edges aligned with each other.

CLKA and CLKB have a clock ratio of A:B where A is a number of clock cycles in a length of time and B is a number of clock cycles in that same length of time. Both A and B are integers. Accordingly, the length of A clock cycles of the first clock equals the length of B clock cycles of the second clock. Thus, the clocks CLKA and CLKB are synchronized, but with a skew. The skew may have a maximum value as determined by an accuracy with which the two clocks are phase locked. The maximum value allowed is a time difference between a clock cycle time and a delay time from a retaining register to an output register as discussed later.

A PLL 101 receives CLKA, performs processing and outputs CLKB and two synchronizing signals, SYNCA and SYNCB used in controlling output of data. Each synchronizing signal is asserted when the clock edges of the two clocks, CLKA and CLKB are aligned. One synchronizing signal is generated for each clock domain, in this example, SYNCA for the first clock domain 108a and SYNCB for the second clock domain 108b.

Figure 3:
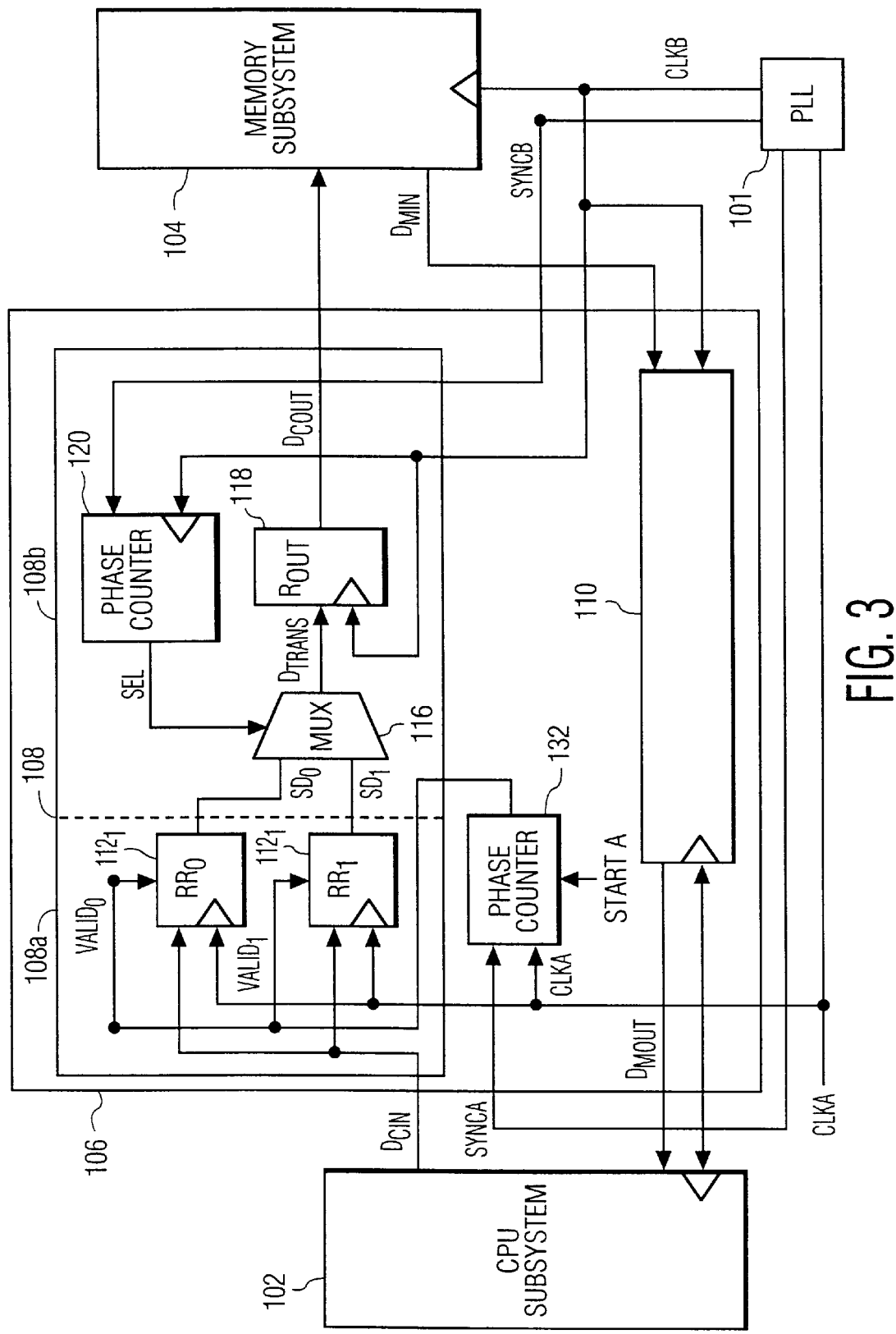
FIG. 3 is a first embodiment of the interface of a system having a 3:2 lock ratio.

FIG. 3 illustrates an example of the interface 106 according to the present invention when the clock ratio is 3:2, i.e., time required for a length of 3 clock cycles of CLKA equals the time required for or length of 2 clock cycles of CLKB. The interface 106 may include interface sections for transferring data from the CPU subsystem 102 to the memory subsystem 104 (CPU/MEM TRANS 108) and from the memory subsystem 104 to the CPU subsystem 102 (MEM/CPU TRANS 110). In the interface 106 of the present invention, a first section 108 transfers data $D_{CIN}$ from the CPU subsystem 102 to the Memory subsystem 104.

Each interface section 108 and 110 includes a first clock domain and a second clock domain. For example, interface section 108 includes, in this example, a first clock domain 108a and a second clock domain 108b. The first clock domain 108a is clocked by the first clock CLKA and receives synchronizing signal SYNCA. Similarly, the second clock domain 108b is clocked by the second clock CLKB and receives synchronizing signal SYNCB. In this example, the first clock domain includes corresponding retaining registers and the second clock domain includes a multiplexer, phase counter register and output register.

More specifically, the first clock domain 108a includes a number of retaining registers equal to A or B (from the clock ratio), whichever is less, for receiving data signals. Therefore, in this example with a 3:2 clock ratio, the number of retaining registers is 2 ($RR_0$-$RR_1$) $112_0$-$112_1$.

Each retaining register $RR_0$-$RR_1$ $112_0$-$112_1$, in this example, receives the data $D_{CIN}$ from the CPU subsystem 102 and outputs a corresponding selected data signal $SD_i$ in response to CLKA and a data valid signal $VALID_i$. The data valid signal $VALID_i$ indicates whether new valid data has been received through the $D_{CIN}$ signal and should be output or whether previous corresponding selected data signal $SD_i$ should be output again. This data valid signal $VALID_i$ is generated based on CLKA and SYNCA. A phase counter 122 is supplied the CLKA and SYNCA signals as well as a START signal. The STARTA signal is a global start signal synchronized to CLKA, indicating the start of a transfer. The data valid signals $VALID_0$ and $VALID_1$ are output by the phase counter 132 when a START signal indicates a start of a transfer. The phase counter 132 insures a minimal temporal spacing, between receiving data in a register and supplying it from that register, in this example, one fast clock period spacing.

The second clock domain 108b includes a multiplexer MJX 116. The MUX 116 selects which selected data signal $SD_1$ of the received selected data signals, in this example $SD_0$-$SD_1$, to output, based on a select signal SEL. The outputted data signal $D_{TRANS}$ is, in this example, supplied to an output register $R_{OUT}$ 118 which outputs an output signal $D_{COUT}$ to the memory subsystem 104 in response to CLKB. The output register $R_{OUT}$ 118 could be included in the memory subsystem 104 instead of the interface 106.

CLKB is also supplied to a phase counter 120 which may be for example, a phase counter register or phase counter flip flop. The phase counter 120 is controlled by the SYNCB sync signal from the PLL 101. The phase counter 120, in this example, receives the second clock signal CLKB and the start signal STARTB, and generates the select signal SEL of 2 bits, to indicate which selected data signal $SD_0$-$SD_1$ in this example, should be output by the MUX 116 as the outputted data signal $D_{TRANS}$.

Figure 4:
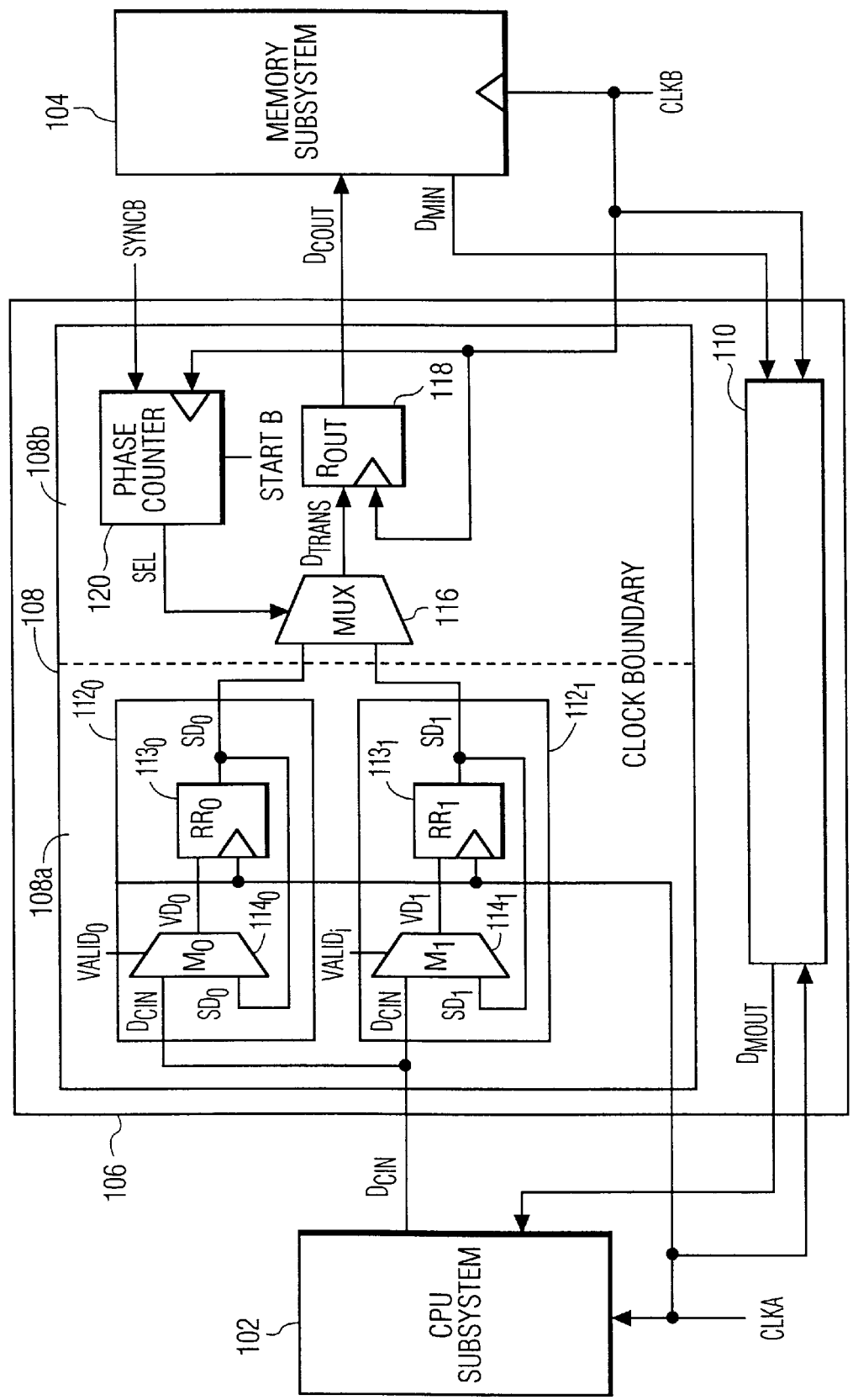
FIG. 4 is a first preferred embodiment of the interface of a system having a 3:2 clock ratio.

In a preferred embodiment illustrated in FIG. 4, each retaining register $RR_0$-$RR_1$ $112_0$-$112_1$ includes a respective register $R_0$-$R_1$ $113_0$-$113_1$ and a respective multiplexer $M_0$-$M_1$ $114_0$-$114_1$. Each multiplexer $M_i$ (I=0 to 1 in this example) receives the $D_{CIN}$ signal and a corresponding selected data signal $SD_i$ and outputs a valid data signal $VD_i$ in response to a data valid signal $VALID_i$.

Each register $R_0$-$R_1$ $113_0$-$113_1$, in this example, receives the corresponding valid data signal $VD_i$ from the corresponding multiplexer $M_i$ 114, and outputs the corresponding selected data signal $SD_i$ in response to CLKA. The multiplexers $M_0$-$M_1$ maintain the contents of the registers $R_0$-$R_1$ $113_0$-$113_1$ by recirculating the output of the registers $SD_0$-$SD_1$, respectively to their respective input. This function may be achieved by other means such as conditionally stopping the clock for each register.

Figure 5:
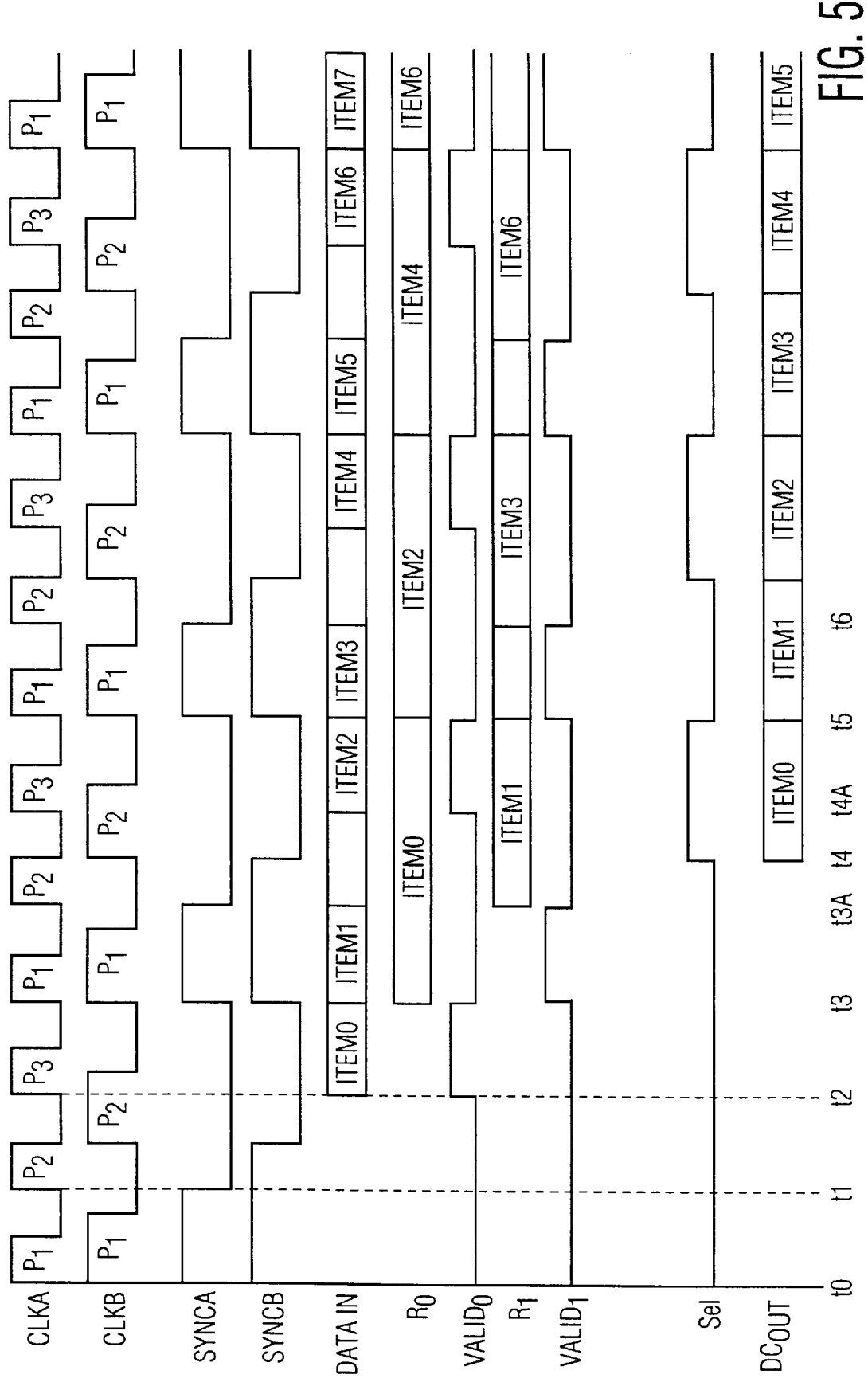
FIG. 5 is a timing diagram for the first embodiment of the interface for the system having a clock ratio of 3:2.

FIG. 5 is a timing diagram for the interface section 108 illustrated in FIG. 4 which transfers data from the CPU subsystem 102 to the memory subsystem 104. The clock ratio of the system is 3:2, i.e., the length of time (clock length cycle) for 3 clock cycles of CLKA which clocks CPU subsystem 102 is equal to the length of time for 2 clock cycles of CLKB which clocks memory subsystem 104. In this example, the maximum value of the skew is the clock length cycle minus the delay time for a signal to propagate from one of the registers in the retaining register or the retaining register, for example register $R_0$ to output register $R_{OUT}$ 118. From the timing diagram, the maximum value of the skew would be the time at $t_4$–the time at $t_3$.

The data $D_{CIN}$ being transferred from the CPU subsystem 102 begins to be clocked in at t2, the 3rd pulse of a clock length cycle of CLKA. This data includes items 0-7 in this example. At time t0, both SYNCA and SYNCB are active for a respective clock pulse cycle, in this example, clock pulse cycle A and clock pulse cycle B. At time t2, $VALID_0$ is active for a clock pulse cycle A, indicating that data presented to $M_0$ is valid and thus, item 0 of the data $D_{CIN}$ is presented to $R_0$ $113_0$ and registered in register $R_0$ $113_0$ at time t3. After SYNCB is active again, in this example at t3, the data $D_{COUT}$ is supplied at t4, the data being based on the SEL signal. In this example, at t3, the SEL signal is inactive, indicating data from $R_0$ is to be supplied. Since MUX 116 and $R_{OUT}$ 118 are both clocked by CLKB, the output data, $D_{COUT}$ is supplied in synchronism with clock CLKB.

Items 1-7 are supplied in a similar manner as above, as shown in the timing diagram of FIG. 5.

Thus, in this example, item 0 is clocked into the first register $R_0$ $113_0$ at t3 and item 1 is clocked into the second register $R_1$ $113_1$, one CLKA clock cycle later at t3A. After a clock cycle delay, new data is registered in the registers $R_{0-1}$ $113_{0-1}$, i.e., items 2-3 are registered in beginning at the third clock cycle (P3 at t4) of a second clock length cycle of CLKA in a similar manner as above. The remaining items are similarly registered.

The data signal $D_{CIN}$ is supplied to the multiplexers $M_{0-1}$ $114_{0-1}$ at each clock cycle. In this example, the valid signal $VALID_0$ indicates that the data signal is valid for $M_0$ $114_0$ at t2 while the data signal is not valid for the remaining multiplexer $M_1$ $114_1$. The data signal $D_{CIN}$ contains item 0 which, at the following clock cycle P1 at t3 is registered into $R_0$ $113_0$. $R_0$ $113_0$ receives item 0 and holds this value for one entire clock length cycle, in this example, 3 clock cycles of CLKA, i.e., multiplexer $M_0$ $114_0$ will not receive a $VALID_O$ signal indicating that data signal $D_{CIN}$ is valid for one entire clock length cycle.

Similarly, $R_1$ $113_1$ receives item 1 when signal $VALID_1$ indicates valid data and the register registers the data from the respective multiplexer $M_1$ $114_1$, holding the respective item for one entire clock length cycle.

The SEL signal supplied by the phase counter 120 indicates to the MUX 116 which selected data signal $SD_i$ output by the registers $R_{0-1}$, is selected for output to the $R_{OUT}$ 118. In this example, when the SEL signal indicates Row item 0 is output as $D_{COUT}$ to the memory subsystem 104 based on the CLKB. Since register $R_{OUT}$ 118 is clocked by CLKB, the output signal $D_{COUT}$ is supplied synchronous to CLKB. Accordingly, beginning at t4 or a clock cycle P2 of a CLKB clock length cycle, items 0-7 are output, one every clock cycle.

Figure 6:
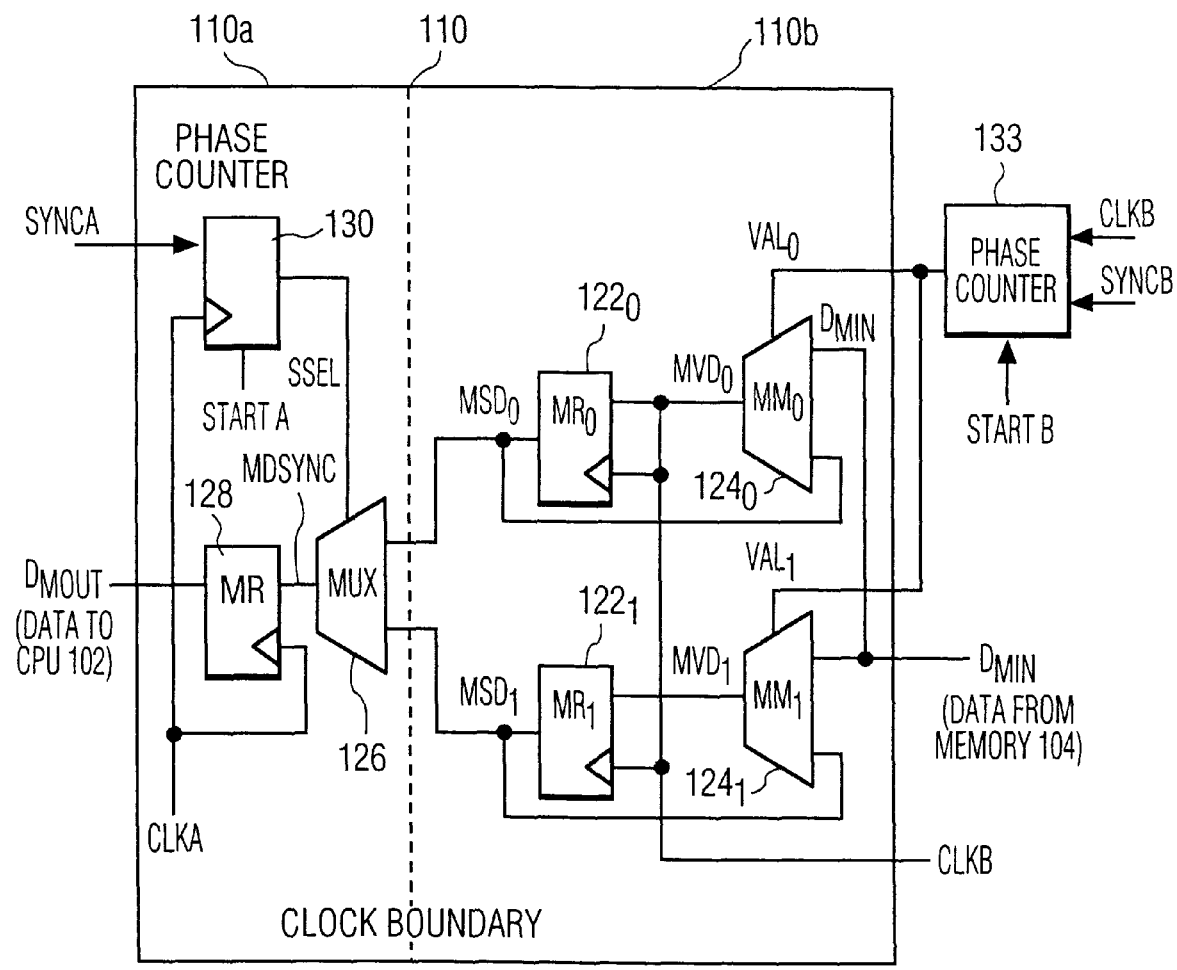
FIG. 6 is a second embodiment of the interface of a system having a 3:2 clock ratio.

FIG. 6 is an embodiment of the MEM/CPU TRANS 110. Similar to the CPU/MEM TRANS 108, MEM/CPU TRANS 110 has a first clock domain 110b and a second clock domain 110a. Additionally, the number of registers is equal to the lesser of A and B, in this example of a 3:2 clock ratio, the number of registers and corresponding multiplexers in the second clock domain 110b is two ($MR_0$-$MR_1$) $122_0$-$122_1$.

Each multiplexer $MM_i$ (I=0 to 1 in this example) $124_0$-$124_1$ receives the $D_{MIN}$ signal and a corresponding selected data signal $MSD_i$ and outputs a valid data signal $MVD_i$ in response to a data valid signal $VAL_i$. The data valid signal $VAL_i$ indicates whether new valid data has been received through the $D_{MIN}$ signal and should be output or whether previous valid data $MSD_i$ should be output again. The respective VAL signals are supplied from a phase counter 133. The phase counter 133 receives the CLKB signal and the SYNCB signal as well as a STARTB signal which is a global start signal synchronized to CLKB, indicating the start of a transfer. The phase counter 133 insures a minimal temporal spacing, between receiving data in a register and supplying it from that register, in this example, one fast clock period spacing.

Each register $MR_0$-$MR_1$ $122_0$-$122_1$, in this example, receives a corresponding valid data signal $MVD_i$ from the corresponding multiplexer $M_i$ $124_i$ and outputs a corresponding selected data signal $MSD_i$ in response to CLKB.

The second clock domain 110a includes a multiplexer MMUX 126. The MMUX 126 outputs which selected data signal $MSD_i$ of the received selected data signals, in this example $MSD_0$-$MSD_1$ to output, based on a select signal SSEL. The outputted data signal $MD_{SYNC}$ is supplied to a register $MR_{OUT}$ 128 which outputs an output signal $D_{MOUT}$ to the CPU subsystem 102 in response to CLKA.

CLKA is also supplied to a phase counter 130 which may be for example, a flip-flop. The phase counter 130 receives the first clock signal CLKA, the start signal STARTA, and the SYNCA signal and generates the select signal SSEL to indicate which selected data signal $MSD_0$-$MSD_1$ in this example, should be output by the MMUX 126 as the outputted data signal $MD_{SYNC}$.

As can now be readily appreciated, the invention allows data transfer between systems having different clocks while preventing meta stability problems from occurring. The invention may be included in any of the subsystems or may be a separate subsystem. One skilled in the art may easily use active signals instead of inactive signals or vice-versa. Additional modifications may easily be made by one skilled in the art.

It will thus be seen that the objects set forth above among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not limiting sense.

It is also to be understood that the following claims are intended to cover all of the generic and specific features of the invention herein described and all statements of the scope of the invention which, as a matter of language, might be said to fall therebetween.

What is claimed:

1. A computer system comprising:

a first subsystem synchronized with a first clock;

a second subsystem synchronized with a second clock;

an interface coupled between said first subsystem and said second subsystem for transferring data between said first subsystem and said second subsystem;

said interface including a plurality of registering units registering data supplied by said first subsystem in response to said first clock and outputting selected data, and a multiplexer unit receiving the selected data registered by said plurality of registering units and outputting output data in response to said second clock and a selection signal, the selection signal indicating which data of the selected data to output;

said computer system has a selected clock ratio of A:B where A indicates a first number of clock cycles of said first clock which occurs in a length of time and B indicates a second number of clock cycles of said second clock which occurs in said length of time;

the number of said plurality of registering units is equal to a lesser of A and B;

each of said plurality of registering units includes
   a valid data multiplexer receiving the data supplied by said first subsystem and receiving previously outputted selected data, said valid data multiplexer outputting valid data in response to a data valid signal, the valid data being one of the data supplied by said first subsystem and previously outputted selected data, and a register receiving the valid data and said first clock and outputting the selected data in response to said first clock.

2. A computer system as recited in claim 1, wherein said multiplexer unit comprises:

a selected data multiplexer receiving selected data from each of said plurality of registering units and outputting a synchronized data signal in response to the selection signal;

a register receiving the synchronized data signal and outputting an output signal in response to said second clock; and a counter for outputting the selection signal in response to said second clock.

3. A computer system as recited in claim 1, wherein said first subsystem is a CPU and said second subsystem is a memory.

4. A computer system as recited in claim 1, wherein said first subsystem is a memory and said second subsystem is a CPU.

5. A computer system as recited in claim 1, wherein certain clock edges of said first and second clocks have a fixed relationship.

6. A computer system as recited in claim 2, wherein said counter is a phase counter flip-flop.

7. A computer system as recited in claim 5, wherein said fixed relationship includes synchronizing of said first and second clocks with an skew.

8. A computer system comprising:

a first subsystem synchronized with a first clock;

a second subsystem synchronized with a second clock;

an interface coupled between said first subsystem and said second subsystem transferring data between said first subsystem and said second subsystem;

said interface including
   a first interface section for synchronizing data transferred from said first subsystem to said second subsystem; and a second interface section for synchronizing data transferred from said second subsystem to said first subsystem, said first interface section having
   a plurality of registering units registering data supplied by said first subsystem in response to said first clock and outputting selected data; and a multiplexer unit receiving the selected data registered by said plurality of registering units and outputting output data in response to said second clock and a selection signal, the selection signal indicating which data of the selected data to output;

said second interface section including a plurality of registering units registering data supplied by said second subsystem in response to said second clock and outputting selected data; and a multiplexer unit receiving the selected data registered by said plurality of registering units and outputting output data in response to said first clock and a selection signal, the selection signal indicating which data of the selected data to output, and said computer system has a selected clock ratio of A:B where A indicates a first number of clock cycles of said first clock which occurs in a length of time and B indicates a second number of clock cycles of said second clock which occurs in said length of time; and the number of said plurality of registering units in said first interface section is equal to a lesser of A and B and the number of said plurality of registering units in said second interface section is equal to a lesser of A and B.

9. A computer system as recited in claim 8, wherein each of said plurality of registering units of said first interface section comprises:

a valid data multiplexer receiving the data supplied by said first subsystem and further receiving previously supplied selected data, said valid data multiplexer outputting valid data in response to a data valid signal, the valid data being one of the data supplied by said first subsystem and said previously supplied selected data; and a register receiving the valid data and said first clock and outputting the selected data in response to said first clock; and wherein each of said plurality of registering units of said second interface section comprises:

a valid data multiplexer receiving the data supplied by said second subsystem and further receiving previously supplied selected data, said valid data multiplexer outputting valid data in response to a data valid signal, the valid data being one of the data supplied by said second subsystem and said previously supplied selected data; and a register receiving the valid data and said second clock and outputting the selected data in response to said second clock.

10. A computer system as recited in claim 8, wherein:

said multiplexer unit of said first interface section comprises:

a selected data multiplexer receiving selected data from each of said plurality of registering units of said first interface section and outputting a synchronized data signal in response to the selection signal of said first interface section;

a register receiving the synchronized data signal and outputting an output signal in response to said second clock; and a counter for outputting the selection signal in response to said second clock; and said multiplexer unit of said second interface section comprises:

a selected data multiplexer receiving selected data from each of said plurality of registering units of said second interface section and outputting a synchronized data signal in response to the selection signal of said second section;

a register receiving the synchronized data signal and outputting an output signal in response to said first clock; and a counter for outputting the selection signal in response to said first clock.

11. A method for synchronizing subsystems having respective clocks, comprising the steps of:

providing a data signal at a first clock, to a plurality of registering units, each registering unit registering selected data of the data signal in response to the first clock, each of said registering units including a valid multiplexer unit receiving the data signal and further receiving previously supplied selected data;

outputting valid data from said valid multiplexer unit in response to a data valid signal, the valid data being one of said data signal and said previously supplied selected data;

supplying the selected data to a multiplexer unit in response to a selection signal and a second clock, a first number of clock cycles of the first clock which occurs in a length of time equaling a second number of clock cycles of the second clock which occurs in said length of time and a number of the plurality of registering units is equal to a lesser of the length of the number of clock cycles of the first clock and the length of the number of clock cycles of the second clock; and outputting the data signal in synchronism with the second clock.

* * * * *